Patented Nov. 3, 1942

2,301,131

UNITED STATES PATENT OFFICE 2,301,131

METHOD OF MAKING UNSATURATED COMPOUNDS

Joy G. Lichty, Stow, Ohio, assignor to Wingfoot Corporation, Wilmington, Del., a corporation of Delaware No Drawing. Application October 2, 1940, Serial No. 359,409

9 Claims. (Cl. 260—464)

This invention relates to a method for the preparation of cyano diolefines and, more particularly, to the preparation of 2-cyano, 1,3-butadienes.

The present invention is based on the discovery that saturated nitriles may be pyrolyzed to yield unsaturated bodies by adding to the nitrile molecule an acyl radical and then removing the corresponding carboxylic acid by pyrolysis. If, in addition to the acyl radical, the saturated nitrile also contains a halogen radical, a hydrogen halide will also be split out to leave a cyano diolefine, such as a cyano 1,3-butadiene compound, the particular compound obtained depending upon the halogenated nitrile selected as the starting material. Also, the starting material may be the intermediate corresponding to the compound resulting when the carboxylic acid has been removed, a halogen-alkyl-substituted acrylonitrile, in which case only hydrogen halide is split off by the pyrolysis.

The pyrolysis is believed to proceed in such manner that there is produced alkyl-substituted acrylonitriles containing one or more halogen atoms in the molecule by the splitting out of a carboxylic acid and the cyano diolefines are then formed by the removal of this halogen in the form of a halogen acid. The reaction may be illustrated by the following equations, indicating the probable course of the pyrolysis of alpha acyloxy alpha (1-chlorethyl)-propionitrile:

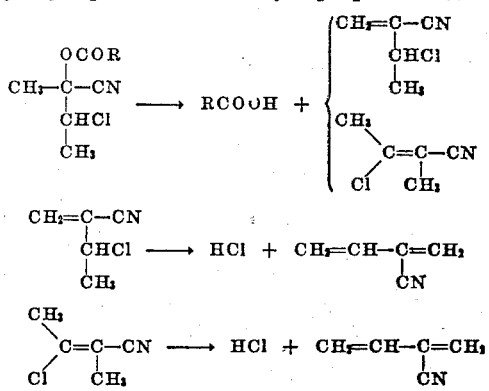

The symbol "R" in the foregoing formulae indicates an alkyl group, usually, but may denote other radicals.

It will be noted that, while two different chloro acrylonitriles may be obtained, each of these can give rise to a 2-cyano 1,3-butadiene by splitting out hydrogen chloride. Usually, a mixture of all three products, and perhaps others, will be obtained, together with unchanged starting material, and the 2-cyano 1,3-butadiene is separated therefrom by appropriate means, as by fractional distillation. It will also be observed that the nature of the acyl radical is not critical since this is removed during the course of the reaction in the form of the corresponding carboxylic acid.

The method may be applied to the preparation of various substituted 2-cyano 1,3-butadiene compounds, such as 2-cyano isoprene, 2-cyano 3-ethyl 1,3-butadiene, 2-cyano 3-chloro 1,3-butadiene, 2-cyano 3-bromo 1,3-butadiene, 2-cyano 4-methyl 1,3-butadiene, 2-cyano 4-ethyl butadiene, and homologous compounds in which other alkyl groups are substituted in the cyano butadiene molecule. The appropriate propionitrile is selected for pyrolysis. Thus, if it is desired to prepare 2-cyano 1,3-butadiene itself or a substituted 2-cyano 1,3-butadiene, then it is necessary to select an alpha acyloxy propionitrile which is alpha substituted by a halogen alkyl group in which the carbon chain containing the halogen has two carbon atoms, in order that a four carbon chain will result. Only a haloethyl substituent produces 2-cyano 1,3-butadiene. Likewise, a halo isopropyl substituent results in a 3-methyl substituted 2-cyano butadiene but a halo alkyl group in which the chain containing the halogen is longer than two carbon atoms gives a 4-alkyl substituted cyano butadiene. Of course, a longer carbon chain may be present as a substituent on the alkyl group.

Obviously, the halogen atom may be chlorine, bromine or other halogen since it is removed during the pyrolysis and does not characterize the final product. Likewise, as mentioned, the nature of the acyl radical in the starting material is not critical since it is similarly removed from the molecule. In fact, any acyl radical which can be readily added to the propionitrile molecule to constitute the starting material, can be used, among such radicals being formyl, acetyl, propionyl, butyryl, benzoyl, toluyl, xyloyl, oxalyl and phthalyl.

The pyrolysis is carried on under conditions which will result in the removal of a molecule of carboxylic acid and a molecule of hydrohalide acid from a molecule of the propionitrile, the conditions for this purpose being selected according to the nature of the starting material. Generally speaking, a temperature ranging from 350–700° C. will be employed, with a preferred range for best results in the neighborhood of 400–550° C. The pressure is usually kept low, although this may range upward to atmospheric pressure, say from 5 mm./Hg to 760 mm./Hg. However, in most instances, the pressure is preferably maintained at about 40–65 mm. The period of time in the reaction zone is ordinarily comparatively short, the rate of flow being adjusted to give maximum yields with a minimum of by-products. The pyrolytic apparatus is also subject to variation, an electrically heated iron tube having been employed, but other apparatus being also suitable. An inhibitor of polymerization should also be present in most cases to prevent any tendency of the unsaturated product to polymerize during the course of the reaction. For this purpose there may be used hydroquinone, phenol and diphenyl para phenylene diamine, as well as other compounds having this function.

To illustrate the procedure followed in preparing the compounds of the invention, the following example is given to which, however, the invention is not limited.

*Example*

The pyrolytic apparatus used in this experiment was a ¾" standard pipe, a 2' length heated by an electric heating unit to a temperature of 500–525° C. The iron tube was filled with quartz pellets and through it was passed a total of 590 grams of the acetylated cyanohydrin of 3-chloro-2-butanone,

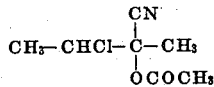

The cyano compound was passed through the system at the rate of 4.5 grams per minute at a pressure of 50–65 mm. The total recovery was 555 grams. Since some of the pyrolytic products are polymerizable, it is desirable to dissolve a polymerization inhibitor, such as hydroquinone, in the product before pyrolysis. The 555 grams of material were washed thoroughly with salt water to remove the acetic acid split off and then dried and distilled in the presence of hydroquinone as inhibitor. The following fractions were obtained:

| Fraction | B. P. °C. | Grams |
|---|---|---|
| 1 | −95° C./21 mm | 160 |
| 2 | 95–150° C./21 mm | 265 |

Fraction #1 was redistilled to yield a number of fractions, of which the low boiling fraction, boiling at 44–50° C./73 mm. polymerized in a short period of time on standing at room temperature. The solid formed by the polymerization was removed and washed with ether. Its analysis gave the following results: percent N found: 17.67; calc. for

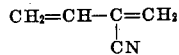

17.75. Thus, the product in this fraction is evidently cyano 1,3-butadiene. The reaction is believed to proceed as follows:

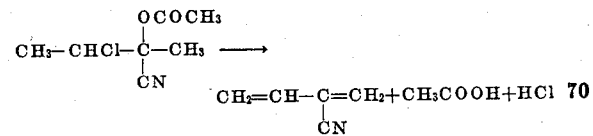

The method is applicable, as stated, to the preparation of cyano diolefines generally, and especially to the preparation of substituted 2-cyano 1,3-butadienes, 2-cyano isoprene being obtainable by substituting in the foregoing example the acetylated cyano hydrin of 3-chloro-3-methyl-2-butanone and 2-cyano-4-methyl 1,3-butadiene being likewise obtainable by the pyrolysis of the acetylated cyanhydrin of 3-chloro-2-pentanone. The formyl or benzoyl cyano hydrins will give the same results, as will compounds with other acyl radicals substituted for the acetyl radical.

While there have been described above the preferred embodiments of the invention, it will be apparent to those skilled in the art that various modifications and changes may be made therein without departing from the spirit of the invention or from the scope of the appended claims.

I claim:

1. A method of preparing cyano diolefines which comprises pyrolyzing an acyloxy propionitrile containing a halogen alkyl radical having at least two carbon atoms to split off a carboxylic acid and hydrogen halide.

2. A method of preparing cyano 1,3-butadienes which comprises pyrolyzing an acyloxy propionitrile containing a halogen alkyl radical having a chain of two carbon atoms to split off a carboxylic acid and hydrogen halide.

3. A method of preparing cyano 1,3-butadienes which comprises pyrolyzing an alpha acyloxy propionitrile containing a halogen alkyl radical having a chain of two carbon atoms to split off a carboxylic acid and hydrogen halide and treating the reaction product to separate a cyano 1,3-butadiene.

4. A method of preparing 2-cyano 1,3-butadienes which comprises pyrolyzing an alpha acytoxy proprionitrile containing a halogen alkyl radical having a chain of two carbon atoms to split off acetic acid and hydrogen halide and recovering a 2-cyano 1,3-butadiene from the reaction product.

5. A method of preparing cyano diolefines which comprises pyrolyzing in the presence of a polymerization inhibitor an acyloxy proprionitrile containing a halogen alkyl radical having at least two carbon atoms to split off a carboxylic acid and hydrogen halide.

6. A method of preparing 2-cyano 1,3-butadiene which comprises pyrolyzing an alpha acyloxy, halo alpha ethyl propionitrile to split off a carboxylic acid and a hydrogen halide and recovering 2-cyano 1,3-butadiene from the reaction product.

7. A method of preparing a 2-cyano 1,3-butadiene in which the 4-position is unsubstituted and the 3-position carries a substituent from the group consisting of hydrogen and alkyl which comprises pyrolyzing an alpha acyloxy hola alpha alkyl propionitrile in which the longest chain in the halo alkyl group contains two carbon atoms and recovering from the reaction product a 2-cyano 1,3-butadiene compound.

8. A method of preparing 2-cyano 1,3-butadiene which comprises pyrolyzing an alpha acetoxy chloro ethyl propionitrile to split off acetic and hydrochloric acids and recovering 2-cyano 1,3-butadiene from the reaction product.

9. A method of preparing 2-cyano 1,3-butadiene which comprises pyrolyzing alpha-acetoxy-alpha (1-chloroethyl) propionitrile to split off acetic and hydrochloric acids and treating the reaction product to recover the 2-cyano 1,3-butadiene.

JOY G. LICHTY.